(12) United States Patent
Schwartz

(10) Patent No.: US 11,647,739 B2
(45) Date of Patent: May 16, 2023

(54) FISHING LURE BLADE BODY ATTRACTOR APPARATUS AND METHODS THEREOF

(71) Applicant: Jason K Schwartz, Deerfield, IL (US)

(72) Inventor: Jason K Schwartz, Deerfield, IL (US)

(*) Notice: Subject to any disclaimer, the term of this patent is extended or adjusted under 35 U.S.C. 154(b) by 260 days.

(21) Appl. No.: 17/186,840

(22) Filed: Feb. 26, 2021

(65) Prior Publication Data
US 2021/0251205 A1    Aug. 19, 2021

Related U.S. Application Data

(63) Continuation of application No. 16/046,129, filed on Jul. 26, 2018, now Pat. No. 10,932,456.

(60) Provisional application No. 62/537,109, filed on Jul. 26, 2017.

(51) Int. Cl.
*A01K 85/14*    (2006.01)
*A01K 85/18*    (2006.01)

(52) U.S. Cl.
CPC .............. *A01K 85/14* (2013.01); *A01K 85/18* (2013.01)

(58) Field of Classification Search
CPC ................................ A01K 85/14; A01K 85/18
USPC ....................................................... 43/42.15
See application file for complete search history.

(56) References Cited

U.S. PATENT DOCUMENTS

| | | |
|---|---|---|
| 1,332,112 A | 2/1920 | Duhamel |
| 1,333,154 A | 3/1920 | Buddle |
| 1,566,059 A | 12/1925 | Willson |
| 1,994,678 A | 3/1935 | Yarvise |
| 2,228,513 A | 1/1941 | Frisbie |
| 2,817,921 A | 12/1957 | Czesnocha |
| 3,165,857 A | 1/1965 | Koziba |
| 3,902,267 A | 9/1975 | Monchil |
| 4,641,455 A | 2/1987 | Johnson |
| 5,522,170 A | 6/1996 | Cole |
| 5,857,283 A | 1/1999 | Perrick |
| 7,444,778 B2 | 11/2008 | Snowberger |
| 7,621,068 B1 | 11/2009 | Renosky |
| 7,627,978 B2 | 12/2009 | Davis |
| 7,726,062 B2 | 6/2010 | Davis |
| 8,919,033 B2 | 12/2014 | Davis |
| D760,866 S | 7/2016 | Monteleone |
| D809,623 S | 2/2018 | Schneider |
| 10,477,845 B1 | 11/2019 | Davis |
| 2002/0189150 A1 | 12/2002 | Thorne |
| 2005/0210731 A1 | 9/2005 | Davis |
| 2008/0127541 A1 | 6/2008 | Shelton |
| 2013/0047491 A1 | 2/2013 | Davis |
| 2015/0007483 A1 | 1/2015 | Thorne |
| 2018/0310538 A1 | 11/2018 | Supinski |
| 2019/0045764 A1 | 2/2019 | Gibson |

(Continued)

OTHER PUBLICATIONS

Z-Man; The Science and Art of Fishing; https://zmanfishing.com/store/categories/chatterbait/original_chatterbait; Mar. 23, 2020.

*Primary Examiner* — Christopher P Ellis
(74) *Attorney, Agent, or Firm* — Patzik, Frank & Samotny Ltd.

(57) ABSTRACT

A blade body of a fishing lure comprises a first protruding side and a second protruding side, creating a gap, and a jig body connected to the blade body such that when the blade body and jig body are connected and pulled through water, the blade body moves in a side to side motion limited by contact between the jig body and the first and second protruding sides.

10 Claims, 5 Drawing Sheets

(56) References Cited

U.S. PATENT DOCUMENTS

2019/0133099 A1      5/2019   Ostruszka
2019/0364864 A1     12/2019   Jacobson
2020/0344986 A1*    11/2020   Queen .................... A01K 85/14

* cited by examiner

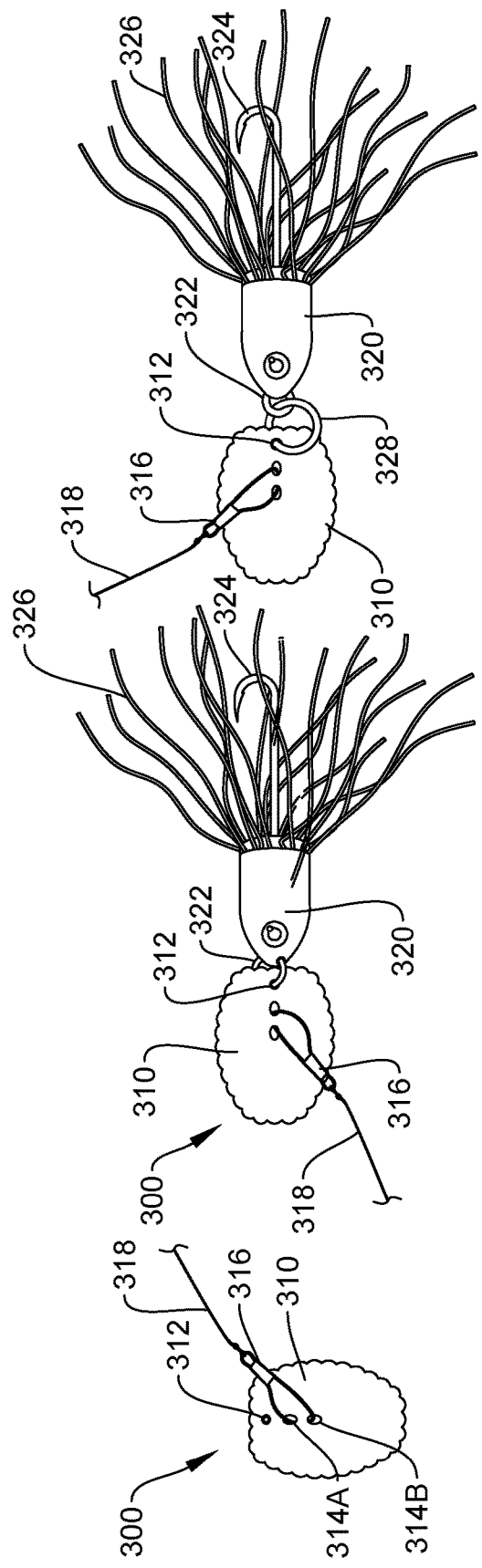
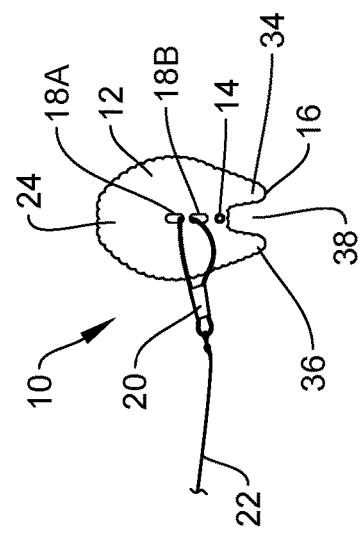
FIG. 3 PRIOR ART
FIG. 4 PRIOR ART
FIG. 5 PRIOR ART
FIG. 6A
FIG. 6B

FISHING LURE BLADE BODY ATTRACTOR APPARATUS AND METHODS THEREOF

The present application is a continuation of and claims priority to U.S. Non-Provisional patent application Ser. No. 16/046,129, filed Jul. 26, 2018, now U.S. Pat. No. 10,932,456, issued Mar. 2, 2021, and entitled "Fishing Lure Blade Body Attractor Apparatus" and U.S. Provisional Patent Application Ser. No. 62/537,109, filed Jul. 26, 2017, entitled "Fishing Lure Blade Body Attractor Apparatus". The entirety of which are hereby incorporated by reference in their entirety.

FIELD OF INVENTION

The present invention relates generally to fishing lure blade body attractors, and more particularly to fishing lures that include a blade body configured to be attached to a jig body with a split ring to create noise, light and vibrations that aid in attracting fish to the lure, as the fishing lure with the blade body is pulled through the water.

The present invention contemplates a blade configuration that comprises fixed gapped protruding sides and which allows attachment of the blade to a jig body by using an attachment device, such as a split ring or equivalent connected between the blade and the eyelet of the jig body, to keep the jig body a predetermined distance away, depending on the size of the split ring, from the blade. This configuration will allow the blade body to swivel, oscillate or otherwise move from one side of the jig head to the other generating noise, reflected light and vibrations as contact is made with the protruding sides, as the fishing lure is pulled through the water. With the head of the jig captured, set or sitting inside the blade, and in particular, inside the protruding sides of the blade, the blade will not stall or foul, will be in constant motion, and thus run true.

The present invention further contemplates a fixed blade configuration that comprises protruding sides in which the protruding sides can preferably range between 10 and 60 degrees from center, and preferably about 14 degrees from center.

The present invention further contemplates the blade configuration comprising a first side and a second side with a surface relief grating image effect component functioning to reflect light in various directions, and positioned on at least one of the first or second sides of the blade body, and possibly on both sides thereby further aiding in attracting fish to the lure, as the fishing lure is pulled through the water. Otherwise known as EXTREME FLASH TECHNOLOGY® (EFT), EFT is a unique patented process that makes the present invention outshine other blades without the particular finish. EFT is a revolutionary process whereby the blade surface is etched in a precise pattern causing small grooves in the surface. These tiny peaks and valleys cause light to disburse in multiple directions along the length, thus making the surface of the blade more reflective and flashier. The blade material may be any type such as metal, non-metal, or alloy.

The present invention further contemplates that the protruding sides can be variable and changed by the user to increase or decrease the distance the blade body will travel before it makes alternating contact with each side of the jig body. Accordingly, by increasing the distance of the protruding sides of the blade away from each other, the time or period between contacts will be greater reducing the overall noise generated. By decreasing the distance of the protruding sides towards each other, the time or period between contacts will be less and contact will occur more often generating more sound overall.

It is also contemplated that the protruding sides can be variable, in which the user can move the sides to any position. Otherwise, the protruding sides can be variable with stops at predetermined locations on the blade, which would only allow a finite number of sizes, but may be more secure in use.

BACKGROUND OF THE INVENTION

Fishing lures and/or attractors are used to attract fish such as through sound, movement, vibration, and color. Most fishing lures incorporate a hook—or plurality of hooks—so that a fish is attracted to the lure and bites the hook. The hook catches the fish when the fish attacks the fishing lure.

There are many types of fishing lures and attractors. They are all manufactured in different ways to resemble prey for the fish in most cases, but are sometimes engineered to appeal to the sense of territory, curiosity or anger of the fish. Most lures are made to look like dying, injured, or fast moving prey and include the following types: jig, surface lure, blade lure, plug, crank bait, artificial fly, soft baits make of plastic or rubber designed to resemble worms, leeches or other creatures, spinnerbait, and swim bait.

As an example, U.S. Pat. No. 8,919,033, titled Snagless Bladed Fishing Lure, discloses a snagless bladed fishing lure in which the blade oscillates side to side during retrieval and pitches forward to protect the hook from snagging upon encountering an obstacle. The blade includes a line keeper and a hook receiver and carries a weight, the hook receiver being located between the line keeper and the weight.

Other examples include related U.S. Pat. Nos. 7,726,062 and 7,627,978, both titled Snag-Resistant Fishing Lure, which disclose a snag-free fishing lure designed to minimize the chances of the lure becoming ensnared. The lure has a jig and a blade attached to the blade in a configuration that limits the side to side movement of the blade, thereby preventing the jig from rolling to a hook-downward position prone to snagging. A centrally aligned hole is positioned close to the front edge of the blade member. An eyelet extending from the jig body is attached through an aperture in the blade. The blade is limited in its side to side movement by contact between the blade edge and either the jig body or the eyelet. The limited side to side movement of the blade creates a quick, controlled, oscillating blade action that imparts a natural swimming motion to the lure, emulating prey species movements.

Another example is U.S. Pat. No. 5,857,283, titled Live Action Fishing Lure, which discloses a live action fishing lure for attachment onto the end of a fishing line to be trolled or cast that provides a fishing lure with a vigorous swimming action for attracting fish. The lure includes a flat blade with a curved stern end and pointed bow, has straight sides, and which blade stern end bent thereacross is tapered from a blade mid-section to the pointed bow end. The blade is connected along its longitudinal axis to a rigging snap for connection to a fishing line that functions also as a pivot coupling allowing the blade to wobble vigorously around its longitudinal axis as it is pulled through water. A snap ring or half ring is fitted through a hole or holes formed in or adjacent to the blade stern end that connects also to a bait device eyelet end that can be a hook eyelet end which snap or half ring functions also as a pivot coupling. The hook includes a forward portion that extends to a right angle bend to a straight center section and is then curved into a barb end. Preferably, the hook includes a weight secured thereto at the right angle bend that is formed therein ahead of a hook straight center section that is covered as by winding thread, feathers, and the like, therearound to have an insect or other bait appearance.

None of these examples provide a fishing lure configured with fixed (or variable) protruding sides to allow attachment of the blade body to a jig body by using an attachment device, such as a split ring or equivalent connected between the blade body and the eyelet of the jig body to keep the jig body a distance away from the blade body, and in which the blade body will swivel, oscillate or otherwise move from one end of the jig body to the other between the protruding sides and generate noise, reflect light and create vibrations as the jig body makes contact with the protruding sides of the blade, as the fishing lure is pulled through the water.

Further, none of these disclosures contemplate a fixed blade configuration that comprises protruding sides in which the protruding sides can preferably range between 10 and 60 degrees from center, and preferably about 14 degrees from center. Additionally, there are no disclosures in which, the protruding sides can be variable and changed by the user to increase or decrease the distance the blade body will travel before contact is made with each of the protruding sides. There are also no disclosures in which the protruding sides can be variable and the user can move the sides to any position, or the protruding sides can be variable with stops at predetermined locations on the blade, which only allows a finite number of sizes, but may be more secure in use.

Further, none of the examples or prior art discloses a blade configuration as set forth above with a first side and a second side with a surface relief grating image effect component on at least one of the sides of the blade body, and possibly on both sides, functioning to reflect light in various directions, thereby further aiding in attracting fish to the lure, as the fishing lure is pulled through the water.

As such, there is a need for an improved fishing lure and/or attractor apparatus and system to improve the attraction of fish to the lure and ultimately to the hook or plurality of hooks. The present invention satisfies this demand.

SUMMARY OF THE INVENTION

The present invention is discussed herein with reference to any type of fishing lure or attractor that includes a blade body component. Fishing lure types that include a blade body component include for example, spinnerbaits, buzzbaits, in-line spinners, French spinners, vibrating lures, casting spoons, jigs, trolling spoons, flutter spoons, weedless spoons and ice blades.

According to the preferred embodiment of the present invention, the blade body component is formed from a brass material that includes a first side and a second side, although the material may be any type such as metal, aluminum, non-metal, or alloy, and may comprise a surface relief grating image effect component, functioning to reflect light in various directions, on at least one side of the blade body component. The surface relief grating image effect component, which functions to reflect light in various directions, can be similar to that described in U.S. Pat. Nos. 7,491,021 and 7,367,759, both titled Surface Relief Grating Image Machining Process And Product, and as described in U.S. Pat. No. 9,888,676, titled Fishing Lure And Attractors And Methods Of Manufacture, all of which are incorporated herein by reference.

The blade body can be formed into any shape and size. For example, shapes includes those known as Colorado, Indiana, Willow, Chopper, French, Dakota, In-Line, Doc Shelton, Muskie, Delta, Propeller, Quad Propeller, Chopper Propeller, Clacker, Jig Dancer, Plug Bill lip, Jitterbug Bib, Flap Tail, Creeper Wings, Tally Wacker Tail, Dodgers and Flashers, to name a few. The size of the blade body is not limited and may include any length and width, as understood by one having ordinary skill in the art.

It is also contemplated the blade body may be of any color, finish, or weight. As examples, the blade body may be gold, silver, copper, red, blue, green or any color combination thereof. The finish may be hammered, smooth or rippled, to name a few, all as understood by one having ordinary skill in the art.

The novel blade body is further configured with fixed protruding sides and an aperture or hole generally along the centerline created between the protruding sides, to allow attachment of the blade body to an eyelet on a jig body by using a split ring or equivalent connected between the aperture on the blade body and the eyelet of the jig body. This configuration allows the jig body to remain a predetermined distance away from the blade body based on the size of the split ring or equivalent, and still allows the blade body to swivel, oscillate or otherwise move from one end of the jig body to the other and generate noise, reflect light and create vibrations as the jig body makes contact with the protruding sides of the blade, as the fishing lure is pulled through the water. The predetermined distance is a function of the size of the split ring or equivalent attachment device as is understood by one having ordinary skill in the art. With the head of the jig body captured or sitting inside the blade body (based on the size of the attachment device), and in particular, inside the protruding sides of the blade body, the blade body will not stall or foul, will be in constant motion, and will thus run true.

The novel blade body can be configured in a fixed blade configuration that comprises protruding sides in which the protruding sides can preferably range between 10 and 60 degrees from center, and preferably about 14 degrees from center.

Additionally, an alternative embodiment to the fixed gapped blade comprises a variable gap protruding sides that can be moved or changed by the user to increase or decrease the distance the jig body will travel before it makes contact with each of the protruding sides. As such, by increasing the distance of the protruding sides of the blade, the time between contacts will be greater and the noise generated will be less overall. By decreasing the distance of the protruding sides, the time or period between contacts will be less and contact will occur more often generating more sound overall. The protruding sides can be variable and the user can move the sides to any position, or the protruding sides can be variable with stops at predetermined locations on the blade, which only allows a finite number of sizes, but may be more secure in use.

In another embodiment, the blade body component includes a curvature, or non-flat or non-straight appearance. The curvature is produced by a die or curving device. By using progressive stamping and an automatic feeder, the blade body can be punched, bent and otherwise modified, resulting in the blade described herein.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The invention can be better understood by reading the following detailed description of certain preferred embodiments, reference being made to the accompanying drawings in which:

FIG. 3 illustrates a prior art embodiment of a fishing lure blade for use with a jig body;

FIG. 4 illustrates a prior art embodiment of a fishing lure blade directly connected to a jig body;

FIG. 5 illustrates a prior art embodiment of a fishing lure blade connected to a jig body using a split ring;

FIGS. 6A and 6B illustrate a top view of a fishing lure blade body in accordance with an embodiment of the present invention;

DETAILED DESCRIPTION OF EMBODIMENTS OF THE INVENTION

Figure 1:
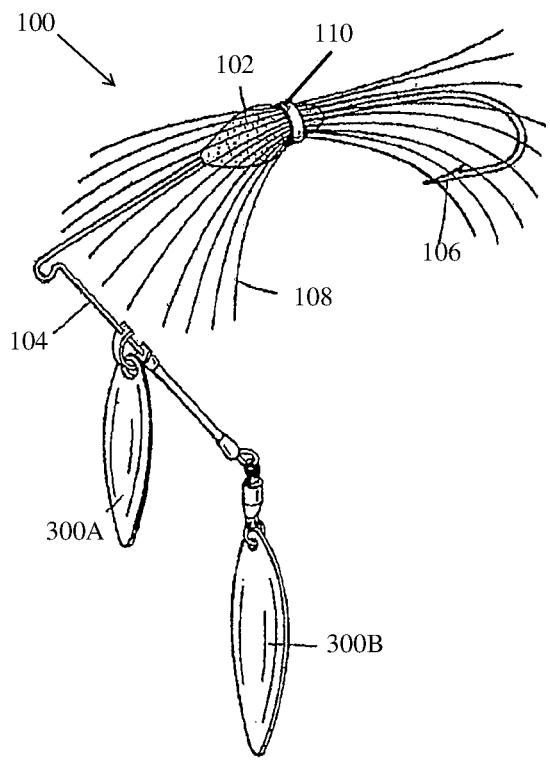
FIG. 1 illustrates a prior art embodiment of a fishing lure including two blade bodies.

As mentioned herein, there are many types of fishing lures and attractors that include a blade body component. As an example, FIG. 1 illustrates one embodiment of a spinner-bait fishing lure that includes two blade bodies. More specifically, as shown in FIG. 1, the spinnerbait fishing lure 100 includes a base element 102 that interconnects to a wire 104 on one end and a hook 106 on the other end. A plurality of streamers (silicone or rubber skirt) 108 surround the base element 102 and are secured by a band (or collar) 110. As shown in FIG. 1, two blade body components 112A, 112B are assembled to the wire 104.

Figure 2:
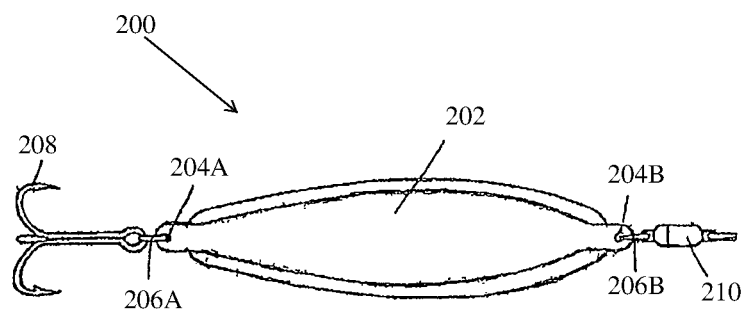
FIG. 2 illustrates a prior art embodiment of a fishing lure including a blade body.

FIG. 2 illustrates another embodiment of a fishing lure using a blade, specifically a minnow spoon fishing lure. More specifically, as shown in FIG. 2, the minnow spoon fishing lure 200 includes a blade body 202 that includes two connection holes 204A, 204B. Rings 206A, 206B engage with connection holes 204A, 204B respectively. A hook 208 assembles to ring 206A and a leader 210 assembles to ring 206B.

FIGS. 3 through 5 show another type of existing blade body, for use with a jig body to create movement in the water replicating a small fish. FIG. 3 shows a top view of a prior art blade 300 in which the blade body 310 has a jig aperture or hole 312 near the top of the blade body 310 and two fastener apertures 314A, 314B below the jig aperture 312. The fastener apertures 314A, 314B allow for a fastener 316 to be connected to the blade body 310 using the fastener apertures 314A, 314B, which allows the fishing line 318 to connect to the fastener, and thus the blade body 310.

FIG. 4 shows a prior art fishing lure in which a jig body 320 is connected directly to the jig aperture 312 by connecting a jig eyelet 322 (which is part of the jig body 320) to the jig aperture 312. The jig body contains a hook 324 and streamers 326 to help hide the hook 324 during use. When the fishing line 318 is pulled through the water, the blade body 310 moves from side to side, but the side to side range of motion is limited by the edges of the jig body 320.

Likewise, FIG. 5 shows a prior art fishing lure in which a jig body 320 is connected to the jig aperture 312 using split ring 328 between the jig eyelet 322 (which is part of the jig body 320) and the jig aperture 312. When the fishing line 318 is pulled through the water, since the blade body 310 is a further distance away from the jig body 320, the blade body 310 moves from side to side, but the side to side range of motion is not limited by the edges of the jig body 320.

FIGS. 6A and 6B show an embodiment of the present invention in which fixed protruding sides 34, 36 are included in the blade body 12 to limit or reduce the side to side range of motion of the blade body 12, even when a split ring 26 is incorporated between the blade body 12 and the jig head 320. FIG. 6A shows a top view of the fishing lure 10 in accordance with the present invention in which a blade body 12 contains a jig aperture 14 near the top 16 of the blade body 12 and two fastener apertures 18A, 18B below the jig aperture 14. The fastener apertures 18A, 18B allow for a fastener 20 to be connected to the blade body 12 using the fastener apertures 18A, 18B, which allows the fishing line 22 to connect to the fastener 20, and thus the blade body 12, as understood by one having ordinary skill in the art. Examples of fasteners include the FASTACH clip, snap swivel, etc. Additionally, the blade body 12 may have a curvature or bend in it at a horizontal location 24 or otherwise be shaped to generate or assist in the preferred movement of the blade body 12 when travelling through the water. The protruding sides 34, 36 are located at the end of the blade body 12 near where the jig body 320 will be attached using an attachment device 26, such as a split ring or an equivalent device.

FIG. 6B shows the preferred dimensions of the novel blade body 12, which shows the blade body at 1.436 inches high by 0.903 inches wide, and includes a fixed range for the protruding sides between 10 degrees and 60 degrees from center, and a preferred fixed angle of 14 degrees from center along with the preferred size for the aperture 14 for the split ring or equivalent of 0.080, near the top 16 of the blade body 12, and the two fastener apertures 18A, 18B of 0.145 inches high by 0.060 inches wide, below the jig aperture 14. Although the distance or gap 38 between the protruding sides will vary depending on the scale of the blade body 12, the distance 38 between the protruding sides 34, 36 is approximately 0.216 inches at the closer end, and approximately 0.270 inches at the wider end. A horizontal curvature or bend 24 will be located 0.350 inches from the bottom of the blade body 12. These dimensions are merely those of the preferred embodiment, and other sizes both scaled and not to scale are covered by the scope of the present disclosure. The present disclosure does not intend to limit the size or scale of the novel blade body 12.

Figure 7:
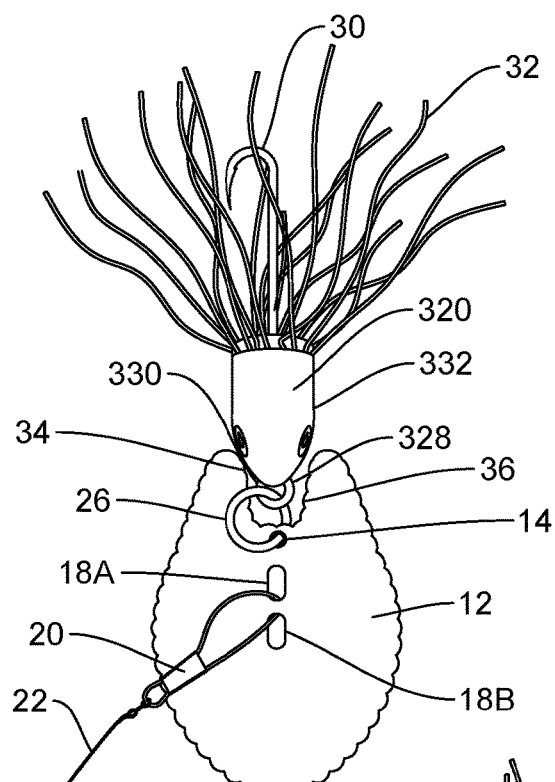
FIG. 7 illustrates a perspective view of the fishing lure blade body connected to a jig body using a split ring in accordance with an embodiment of the present invention.

FIG. 7 shows a top view of the fishing lure 10 in accordance with the present invention in which a jig body 320 is connected to the jig aperture 14 using a split ring 26 between the jig eyelet 28 (which is part of the jig body 320) and the jig aperture 14. The jig body 320 contains jig body sides 330, 332, a hook 30 and streamers 32 to help hide the hook 30 during use. When the fishing line 22 is pulled through the water, the fastener 20, which is connected to the fishing line 22, and is connected to the blade body 12 through the fastener apertures 18A, 18B, pulls the blade body 12 through the water also.

Figure 8A:
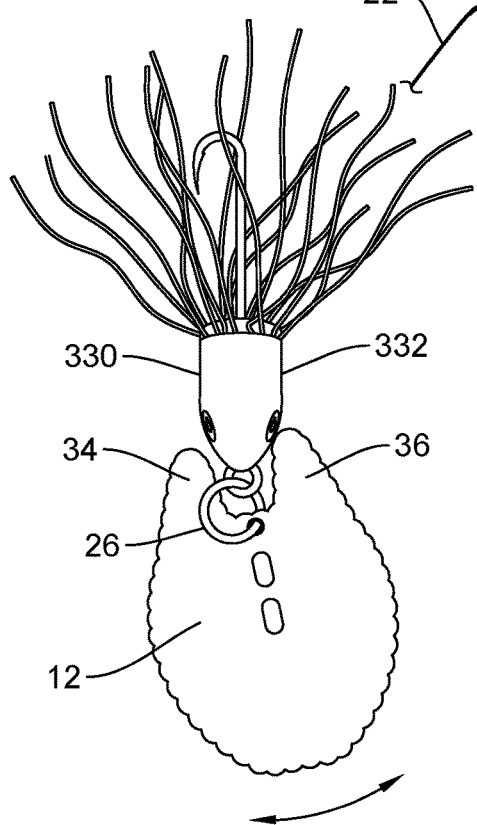
FIGS. 8A and 8B illustrate the motion of the fishing lure blade body connected to a jig body using a split ring in accordance with an embodiment of the present invention.
Figure 8B:
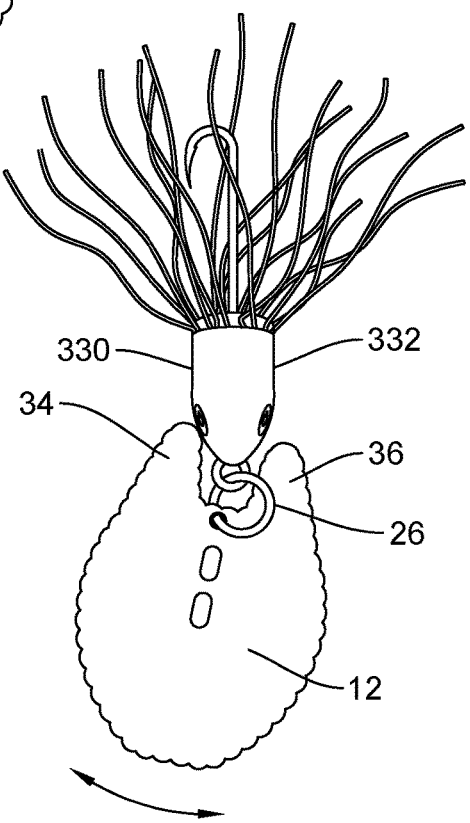

As the blade body 12 moves through the water, the shape of the blade body 12 forces the blade body 12 to move from side to side (see FIGS. 8A and 8B). However, the side to side range of motion of the blade body 12 is limited when the each of the protruding sides 34, 36 of the blade body 12, makes alternating contact with the jig body sides 330, 332 of the jig body 320. Again, for example, the protruding sides 34, 36 of the novel blade body 12 have a preferred fixed range of between 10 and 60 degrees from center, and a preferred fixed angle of 14 degrees from center, and a distance of 0.18 inches at the closer end and 0.20 inches at the wider end. This configuration limits the side to side movement of the blade body 12 as described herein. Other angles can also provide the same functionality, including providing protruding sides 34, 36 that are parallel to each other (not shown). With the head of the jig body 320 captured, set or sitting inside the blade body 12, and in particular, inside the protruding sides 34, 36 of the blade body 12, the blade body 12 will not stall or foul, will be in constant motion, and will thus run true.

Figure 9A:
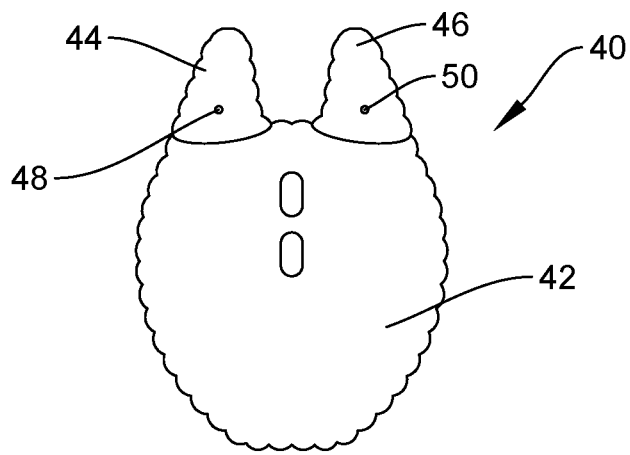
FIGS. 9A, 9B and 9C illustrates a top view of a fishing lure blade body in accordance with an alternative embodiment of the present invention.
Figure 9B:
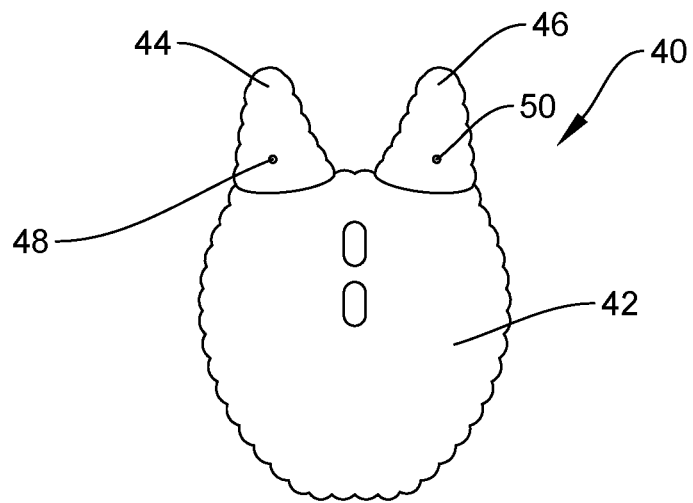
Figure 9C:
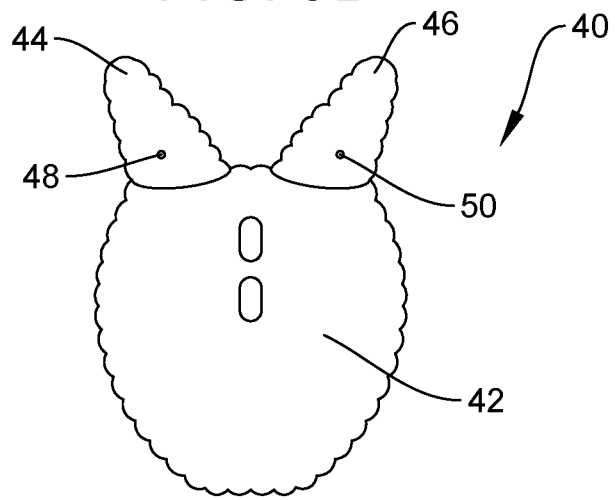

FIGS. 9A, 9B and 9C show an alternative embodiment of the present invention in which the fishing lure 40 comprises a blade body 42 having variable protruding sides 44, 46 that pivot around a pivot point 48, 50, instead of a fixed position, such that the user can move the variable protruding sides 44, 46 to different positions to increase or decrease the side to side range of the blade body 42 (see FIGS. 7, 8A and 8B) before contact is made with the variable protruding sides 44, 46.

FIG. 9A shows the alternative embodiment in which the variable protruding sides 44, 46 are placed in the same location as those on the blade body 12 in FIGS. 6, 7, 8A and 8B. The blade body 42 will remain in the same configuration unless and until the user manually moves one or both of the variable protruding sides 44, 46 to a different location. FIG. 9B shows the same blade body 42, but with the variable protruding sides 44, 46 moved slightly away from each other. FIG. 9C shows the same blade body 42, but with the variable protruding sides 44, 46 even further away from each other.

By increasing or decreasing the distance of the variable protruding sides 44, 46, the distance that the blade body 42 will travel before it makes contact with each side of the jig body sides 330, 332 will increase or decrease. Accordingly, by increasing the distance of the variable protruding sides 44, 46 of the blade body 42, the time or period between contacts will be greater reducing the overall noise generated. By decreasing the distance of the variable protruding sides 44, 46, the time or period between contacts will be less and contact will occur more often generating more sound overall.

Further, the variable protruding sides 44, 46 can be infinitely variable, in which the user can move the variable protruding sides 44, 46 to any position (similar or different distance for each side). Otherwise, variable the protruding sides 44, 46 can have indents or stops (not shown) at predetermined locations on the blade body 42, which would only allow a finite number of locations for the variable protruding sides 44, 46 to be moved to, but may be more secure in those locations.

The present invention as discussed herein can be used with any type of fishing lure in which a blade body and a jig head is contemplated, for example, spinnerbait, buzzbaits, in-line spinners, French spinners, vibrating lures, casting spoons, jigs, trolling spoons, flutter spoons, weedless spoons and ice blades. Any shape blade body is contemplated, for example, Colorado, Willow, Indiana, Chopper, French, Dakota, In-Line, Doc Shelton, Muskie, Delta, Propeller, Quad Propeller, Chopper Propeller, Clacker, Jig Dancer, Plug Bill lip, Jitterbug Bib, Flap Tail, Creeper Wings, Tally Wacker Tail; and attractors, such as Dodgers, Flashers, and Divers, among others.

As understood by one having ordinary skill in the art, and as shown in the figures, a blade body is formed from material that includes a first side and a second side. The material may be any type such as metal, non-metal, or alloy. A surface relief grating image effect component functioning to reflect light in various directions, can be positioned on the first side of the material, although it is contemplated that the surface relief grating image effect component can be placed on the second side, or both sides of the material. The surface relief grating image effect component is further described in U.S. Pat. Nos. 7,491,021 and 7,367,759, both to Kozlowski, both titled Surface Relief Grating Image Machining Process And Product, and described in U.S. Pat. No. 9,888,676, to Schwartz, titled Fishing Lure And Attractors And Methods Of Manufacture, all of which are incorporated herein by reference.

The material can be formed into a blade body of any size and shape, such as by stamping, embossing, pressing, punching, and cutting, for example, water jet cutting, laser cutting and steel rule die, or die cutting. In the preferred embodiment, a progressive stamping procedure is used to form the blade body. After the material is formed into the blade body, in certain embodiments the blade body may include a curvature, which may vary depending on the intended vibration of the device or water displacement, such as that shown in FIG. 10 and described below.

Figure 10:
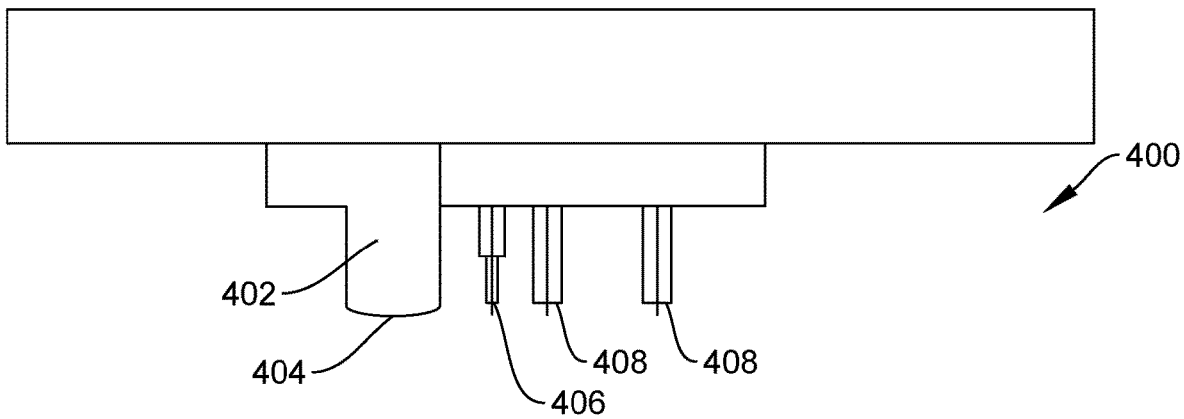
FIG. 10 illustrates a perspective view of a progressive stamping system to produce a curvature of the blade body component and holes according to one embodiment of the present invention.
Figure 10:
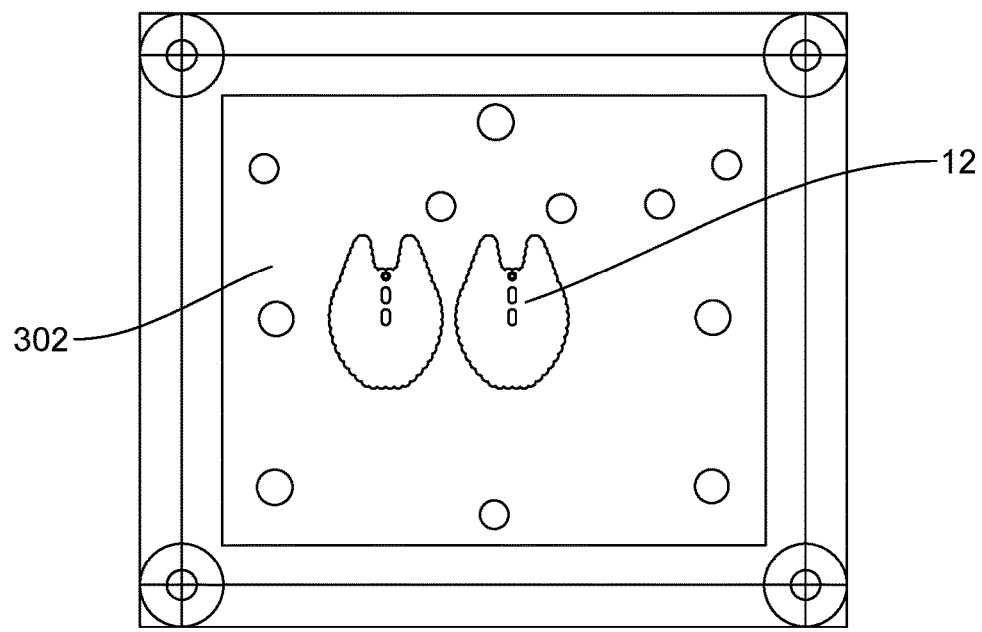
Figure 10:
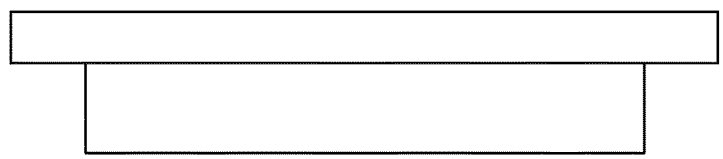

The curvature within the blade body 12 and holes according to one embodiment of the present invention are produced by a progressive stamping system 400 as illustrated in FIG. 10 and as known by those having ordinary skill in the art. The progressive stamping system 400 contains a curving device 402 having a bottom component 404, with a convex shape. The stamping system 400 also contains a hole punch 406 and various guide posts 408. A sheet of material 302 is automatically or manually fed into the progressive stamping system 400 and is positioned using the guide posts 408. The progressive stamping system 400 is then closed and the bottom component 404 of the curving device 402 makes contact with the material 302 and creates the curved surface if required, or a horizontal bend, depending on the set up. At the same time, the hole punch 406 places a hole in the material 302 and the force of the stamping process cuts the newly formed blade 12 from the material 302. The system 400 is then opened and the material 302 is fed again into place for the next stamping. FIG. 10 shows an example of a progressive stamping system 400 for a blade body in accordance with the present invention as shown in FIG. 6B, although any size and shaped blade can be manufactured from this process.

There are several ways that these blades and attractors can be finished to achieve different colors and luster (reflectivity), such as powder-coating (powder paints), use of automotive paints, acrylic paints, epoxy paints, vinyl paints, water based paints, lacquer paints, anodizing and plating. Other methods of finishing the blades and attractors can be used in accordance with the present invention as understood by those having ordinary skill in the art of finishing metal material.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

The invention claimed is:

1. A fishing lure apparatus comprising a blade body, said blade body containing a first protruding side and a second protruding side and a gap between said first protruding side and said second protruding side, said blade body containing at least one hole, said blade body configured such that when said blade body is pulled through water, said blade body will create a vibration and move from side to side.

2. The fishing lure apparatus in claim 1, further comprising a jig body, said jig body configured to be connected to said blade body such that when said jig body and blade body are connected and pulled through water, said blade body will move from side to side and make alternating contact with the jig body at the first protruding side and at the second protruding side of the blade body, thereby limiting the side to side range of the blade body.

3. The fishing lure apparatus in claim 2, wherein said blade body is configured with a curvature to create vibration as it is pulled through water.

4. The fishing lure apparatus in claim 2, wherein said jig body is connected to said blade body using an attachment device.

5. The fishing lure apparatus in claim 4, wherein said attachment device is a split ring.

6. The fishing lure apparatus in claim 2, wherein said first protruding side and said second protruding side are angled between 10 and 60 degrees from center.

7. The fishing lure apparatus in claim 2, wherein said first protruding side and said second protruding side are angled 14 degrees from center.

8. The fishing lure apparatus in claim 2, wherein said gap is of a fixed size.

9. The fishing lure apparatus in claim 2, wherein said gap is of a variable size and can be varied by the user.

10. The fishing lure apparatus in claim 2, wherein said blade body comprises a surface relief grating image effect component functioning to reflect light in various directions.

* * * * *